(No Model.)

W. MAYNARD.

FILTER.

No. 264,314.  Patented Sept. 12, 1882.

WITNESSES:

INVENTOR:
Wm Maynard
BY
ATTORNEYS.

United States Patent Office.

WILLIAM MAYNARD, OF NEW YORK, N. Y.

FILTER.

SPECIFICATION forming part of Letters Patent No. 264,314, dated September 12, 1882.

Application filed November 11, 1881. (No model.)

*To all whom it may concern:*

Be it known that I, WILLIAM MAYNARD, of the city, county, and State of New York, have invented a new and useful Improvement in Filters; and I do hereby declare that the following is a full, clear, and exact description of the same, reference being had to the accompanying drawings, forming part of this specification, in which—

Figure 1:
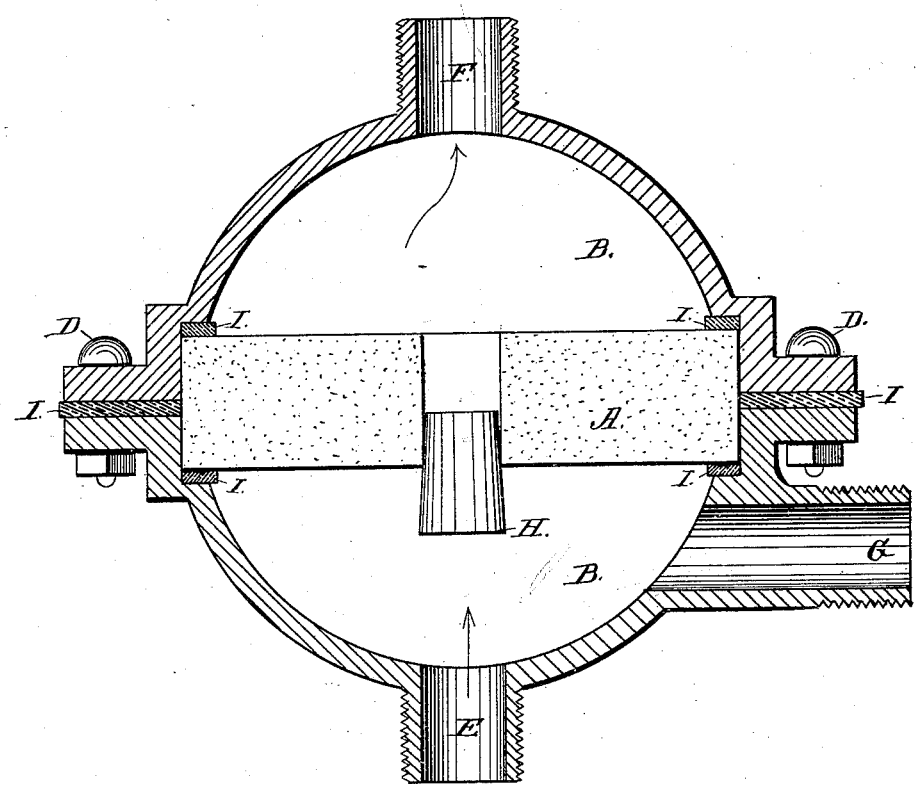
Figure 2:
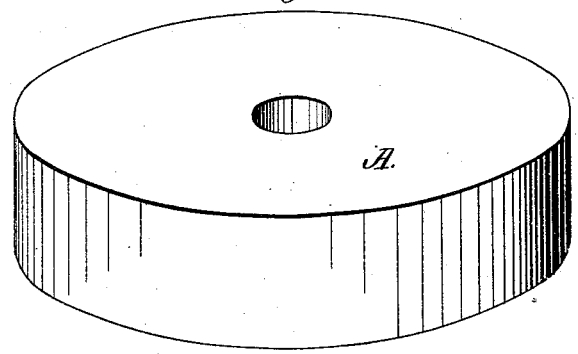
Figure 3:

Figure 1 is a vertical central-section. Fig. 2 is a perspective view of the disk or filtering-diaphragm. Fig. 3 is a perspective view of the cork or elastic plug which fits in the central aperture of the disk.

The object of this invention is to furnish an improved device for filtering water and other liquids, which shall be so constructed as to thoroughly filter the liquid and enable the collected refuse to be readily removed from the filter.

In the drawings, A represents the disk or filtering medium, which is made of corundum. B B are two hemispherical cups, whose edges have ears or lugs, that are fastened together by screws D, a series of which are used.

I are elastic washers or gaskets, placed between the edges of the cups B and the filtering-disk to make a tight joint.

E F are the pipes of ingress and egress, the lower one, E, being that by which the water enters into the filter, and the upper one is the one by which it flows out.

G is the pipe by which the water flows without filtration whenever it is required for purposes that do not require filtered water; or whenever the filter becomes filled with dirt by opening pipe G the deposit is washed away.

Fig. 2 shows the shape of the filter proper, which is that of a disk with a hole through the center. I do not, however, confine myself to the special or particular shape of the filter proper, as this may be varied without departing from my invention.

H is a tapered cork or other elastic stopper, placed in the hole in the center of the filter proper for the purpose of reducing, by its compressibility and elasticity, the breaking-strain on the filter. By making the stopper cone-shaped it is prevented from being forced through by the pressure of the water.

Having described the construction of the filter, I will now proceed to describe the material of which the filter proper is made.

I take corundum, and selecting it carefully from all impurities, and as carefully selecting its uniform atomic structure with regard to weight, size, and so forth, I compress it, so that, while it is mechanically pressed together so that no atoms of organic matter can permeate its structure or insterstices, yet it is thoroughly pervious to water or other limpid liquid, the sharp points and angles of the material, together with the hardness and smoothness of its faces, preventing any amount of organic matter from collecting within any insterstices upon the surface, while the angular points of incidence peculiar to the material of which the filtering medium is composed allow the liquid to pass through the sinuous interstices, and at the same time prevent the organic matter or dirt from passing through, rendering the matter of cleaning the filter an easy one by means of the pipe G; and when the filter proper or filtering medium shall have by long use of very dirty liquid become useless for the purpose, then by simply detaching the upper from the lower part of the filter by means of the screws the filter proper can be taken out and a fresh one placed in its stead, all that is required to purify the old one being simply to burn out the impurities.

In defining my invention more clearly, I would state that I am aware that artificial stones of various composition have been made use of as filtering media, and that alumina has been incorporated in some of these artificial filtering media. Now, as corundum is one species of alumina, I would state that I do not claim broadly the use of alumina for that purpose, as there are many forms of alumina that have no value in this connection. Thus, for instance, some of the fine clays are mainly alumina, but not applicable to my use. Corundum, while of substantially the same chemical composition, is distinguished by its sharply-crystalline structure, with sharp edges and numerous angles of incidence, which cause it to conglomerate with greater tenacity, and thus resist the hydrostatic pressure of water, and also to afford a greater number of interstices, while the sharp angles and corners of its ultimate particles catch all the organic matter that is required to be filtered out of the water. Furthermore, when the corundum particles are being conglomerated into a mass by heat and pressure the sharp angles characteristic of this special substance are fused, and this cements the whole together, forming a mineral sponge which has great strength and is easily cleaned by being burned out.

Having thus described my invention, what I claim as new is—

1. A filtering medium composed of corundum in the form of a porous conglomerate, as described.

2. The combination, with a filter case or chamber, of a rigid porous filtering medium having a hole through the same provided with an elastic stopper, substantially as and for the purpose described.

WM. MAYNARD.

Witnesses:
WM. G. SHAW,
G. R. K. SMITH.